Figure 1:
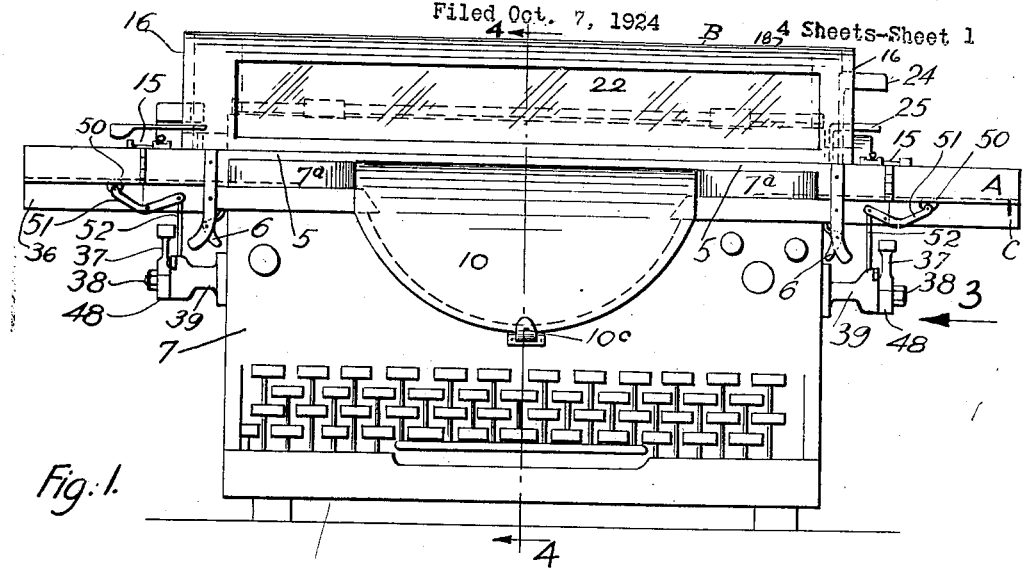

Jan. 3, 1928.

R. G. DANIEL 1,654,922

SILENCING ATTACHMENT FOR TYPEWRITERS

Filed Oct. 7, 1924      4 Sheets-Sheet 1

INVENTOR.
R. G. Daniel
BY
ATTORNEY.

Jan. 3, 1928.
R. G. DANIEL
1,654,922
SILENCING ATTACHMENT FOR TYPEWRITERS
Filed Oct. 7, 1924    4 Sheets-Sheet 2
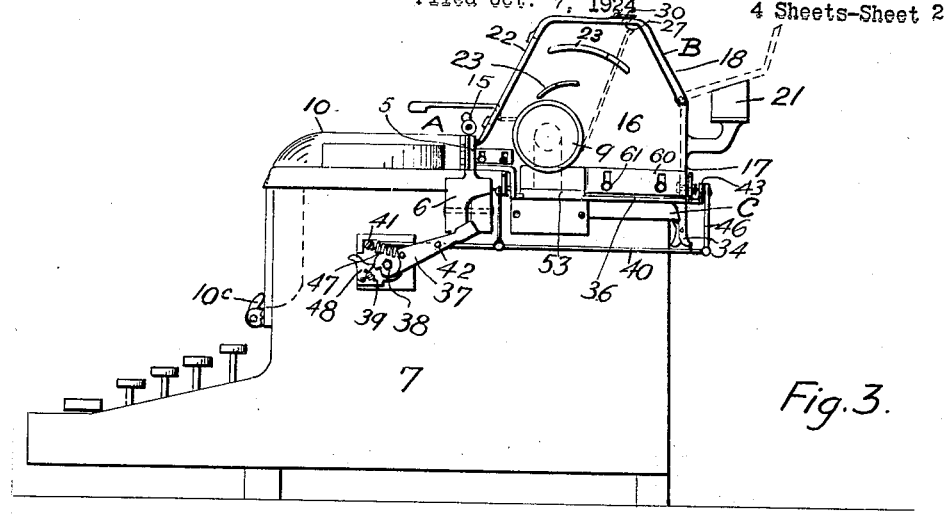
Fig. 3.
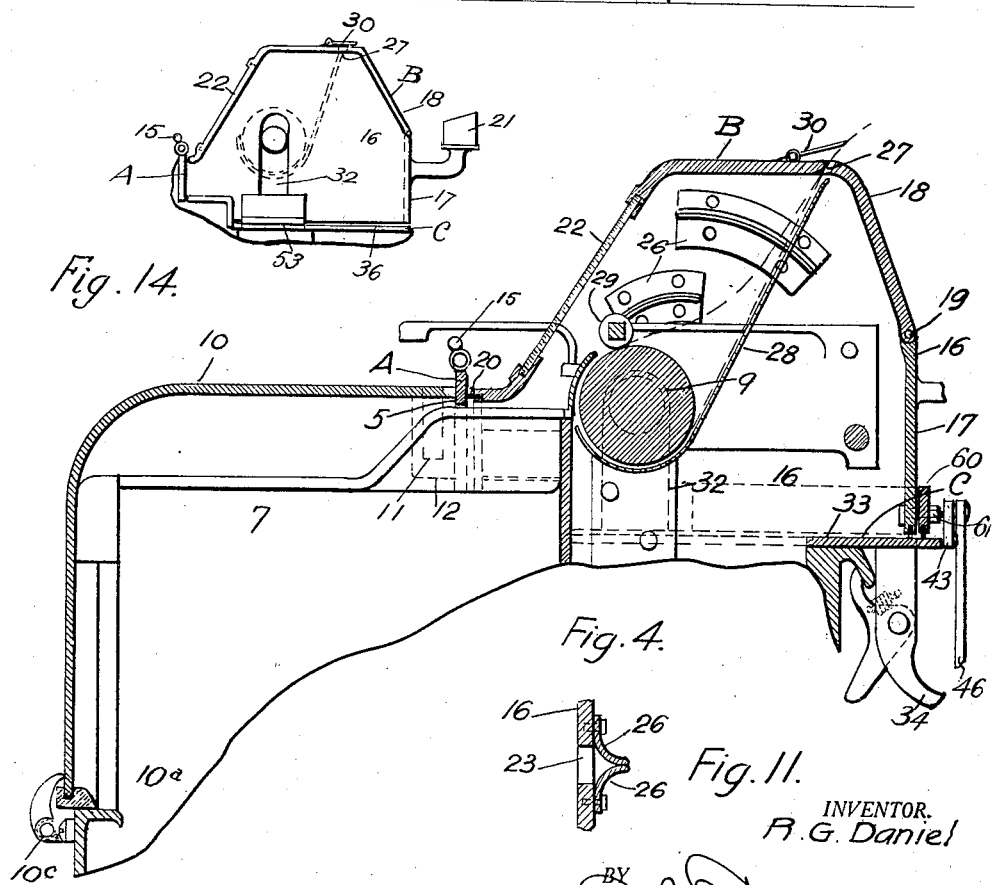
Fig. 14.
Fig. 4.
Fig. 11.
INVENTOR.
R. G. Daniel
BY
ATTORNEY.

Jan. 3, 1928.
R. G. DANIEL
1,654,922
SILENCING ATTACHMENT FOR TYPEWRITERS
Filed Oct. 7, 1924
4 Sheets-Sheet 3
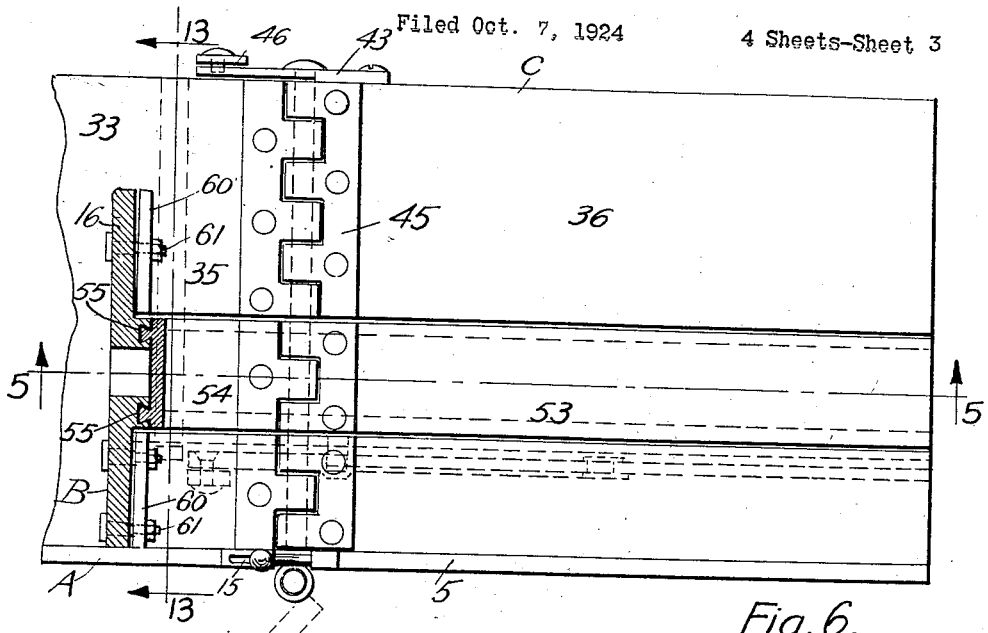
Fig. 6.
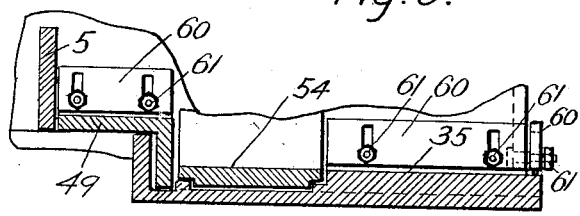
Fig. 13.
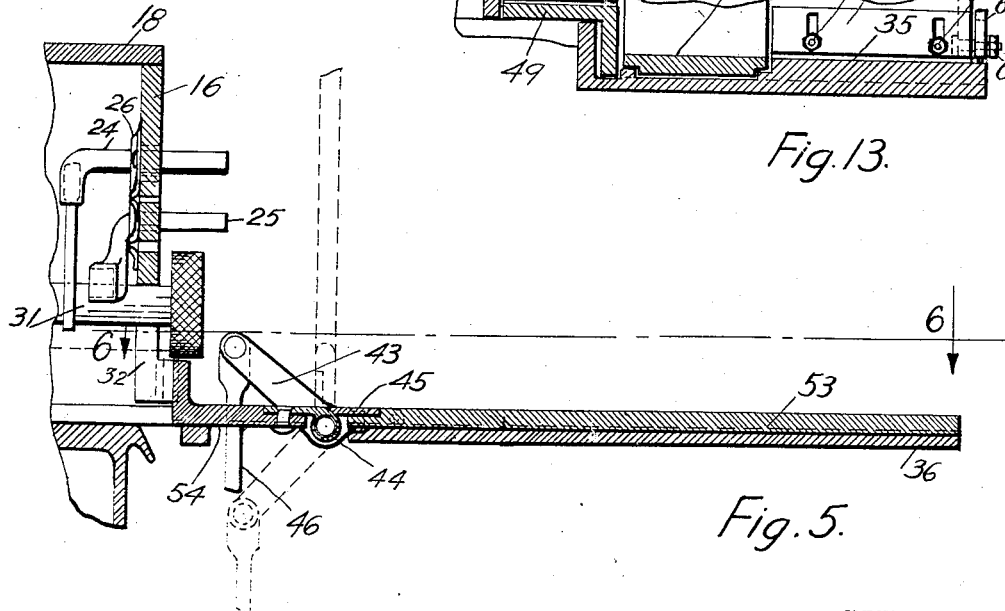
Fig. 5.
INVENTOR.
R. G. Daniel
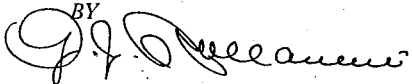
ATTORNEY.

Jan. 3, 1928.
R. G. DANIEL
1,654,922
SILENCING ATTACHMENT FOR TYPEWRITERS
Filed Oct. 7, 1924 4 Sheets-Sheet 4
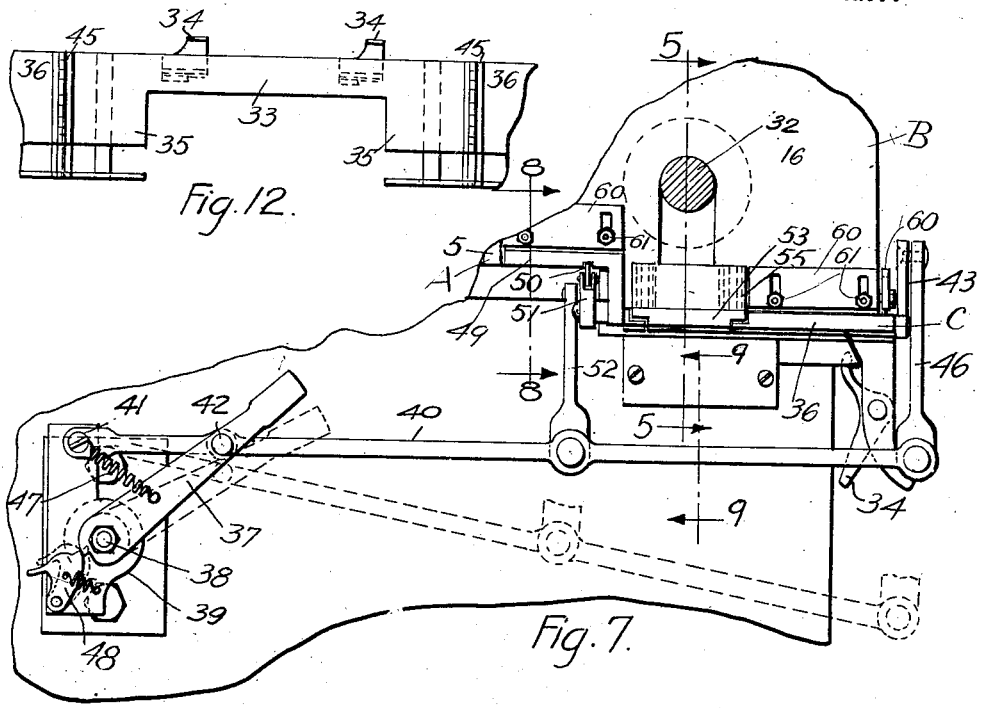
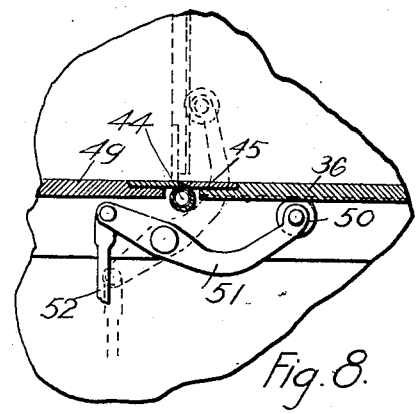
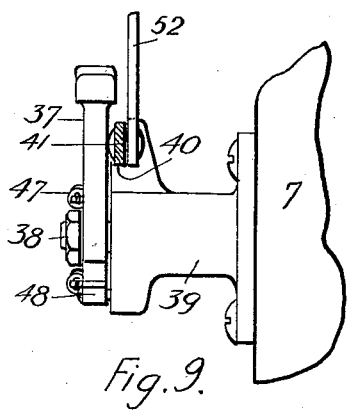
INVENTOR.
R. G. Daniel.
BY
ATTORNEY.

Patented Jan. 3, 1928.

1,654,922

UNITED STATES PATENT OFFICE.

ROYAL G. DANIEL, OF DENVER, COLORADO, ASSIGNOR TO THE UNDERWOOD TYPEWRITER COMPANY, OF NEW YORK, N. Y., A CORPORATION OF DELAWARE.

SILENCING ATTACHMENT FOR TYPEWRITERS.

Application filed October 7, 1924. Serial No. 742,186.

This invention relates to silencing attachments for typewriters and it is an object of the invention to provide a device of simple construction comprising elements which in connection with the frame and the carriage of a typewriting machine of the conventional form, co-operate to insulate the noise producing parts of the machine by enclosure, without interfering with the operation of the machine.

Other objects of the invention relating more specifically to the construction and arrangement of the parts included in the elements above referred to, will be pointed out in detail in the course of the following description with reference to the accompanying drawings in which a simple and practical embodiment of the invention has been shown in connection with a typewriting machine.

The machine illustrated in the drawings does not represent any particular make but is more or less arbitrarily drawn to aid in explaining the position of the elements comprised in the invention relative to the fixed and movable parts thereof and inasmuch as it is an aim of the invention to provide a silencer which is applicable to different standard types of writing machines varying in proportions and details of construction, it will be understood that changes in the form, proportions and relative arrangement of the elements and constituent parts of the silencing device may be availed of without departing from the spirit and scope of the invention as hereinafter described and indicated in the hereunto appended claims.

Figure 2:
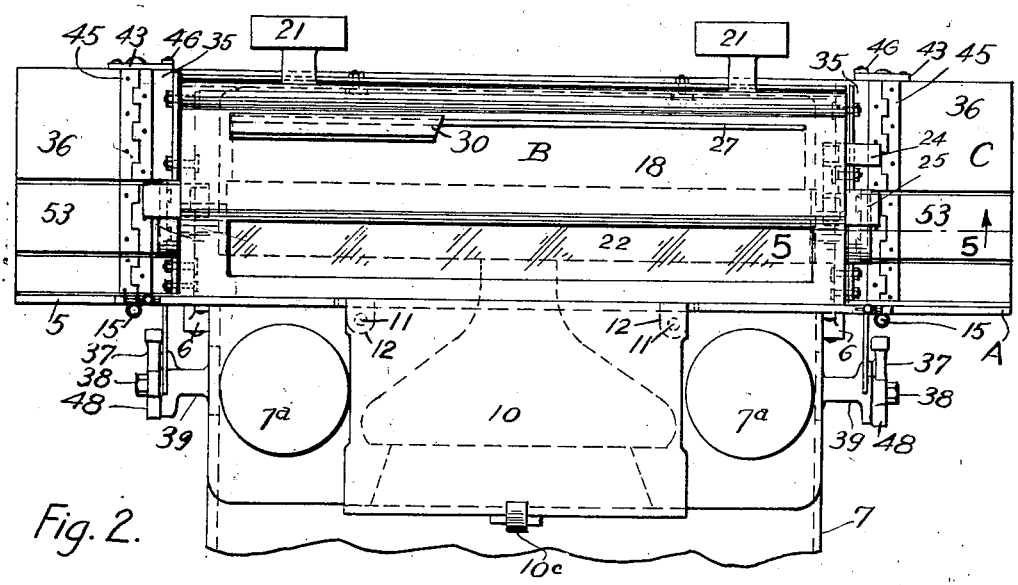
Figure 10:
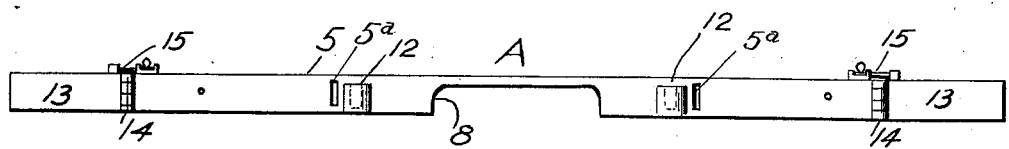

In the drawings in the several views of which like parts are similarly designated throughout the several views, Figure 1 represents a front elevation of a typewriting machine with my silencer in operative relation thereto;

Figure 2, a partially broken top view of the machine shown in Figure 1;

Figure 3, a side elevation of the machine looking in the direction of the arrow 3 in Figure 1;

Figure 4, a fragmentary vertical section on the line 4—4, Figure 1, drawn to an enlarged scale;

Figure 5, a further enlarged fragmentary vertical section taken on the line 5—5, Figure 2;

Figure 6, a horizontal section along the line 6—6, Figure 5;

Figure 7, an enlarged partially sectional side elevation of the mechanism for adjusting the position of the bottom parts of the movable element of the silencer, looking in the direction of the arrow 3 in Figure 1;

Figure 8, a fragmentary section taken on the line 8—8, Figure 7;

Figure 9, a partially broken section along the line 9—9, Figure 7;

Figure 10, a front view of the element of the invention fastened to the frame of the typewriting machine in front of the carriage thereof;

Figure 11, an enlarged section along the line 11—11, Figure 3;

Figure 12, a fragmentary plan view of the element of the invention fixed rearwardly of the carriage of the machine;

Figure 13, a section taken on the line 13—13, Figure 6; and

Figure 14, a fragmentary side view of the casing element included in the attachment, showing a modification in the construction of the element.

In detail, the construction illustrated in the drawings, comprises three co-operating elements A, B and C, two of which are in practice fixed to the frame of the typewriting machine while the other is mounted upon the sliding carriage of the same.

The element A consists of a plate 5 which by means of clamps 6 of suitable construction, is fixed in an upright position to the frame 7 of the typewriting machine immediately forward of the carriage of the same. The plate 5 which is shown in detail in Figure 10, has a central opening 8 to admit of the keys of the machine moving to and from the platen 9 on the carriage and around this opening is attached a forwardly projecting cover 10 which by contact with the outer surface of the frame 7 completely encloses the openings in the top and front thereof by which the "basket" of pivoted keys are accessibly exposed.

The cover may be detachably fastened by dowel pins 11 inserted in sockets 12 of the plate as in the construction shown in the drawings, or it may be formed as in integral part of the plate if so desired.

The plate and the cover of the element A, are preferably made partially or entirely of glass or if made of other material, the parts of this element as well as those of the other elements hereinafter to be described, must be made of sound-proof material such as heavy rubber, papier mâché, or other composition, or of a composite construction of side plates and an interposed substance, or of metal or wood lined with sound-proof material.

Inasmuch as this feature of the invention is not new per se, having been employed in other devices of similar character, the parts of the device have been shown in the drawings in their simplest form as constructed of a solid material.

The plate 5 provides a slide-surface for the element B which as stated before, is mounted on the carriage of the writing machine, and in order to engage said element during the entire movement of the carriage and in the extreme positions of the same, it is essential that the ends of the plate project laterally beyond the sides of the frame of the machine to which it is attached.

In order to prevent of the projecting ends of the plate interfering with the storage of the machine in the well of a typewriter desk or under a cover when not in use, the plate may be removed by loosening the clamps from the frame, but in order to avoid the work and annoyance connected with the removal and replacement of the plate, it is preferred to make the end portions 13 thereof separate from the body portion which is attached to the frame, and connect said portions by hinges 14 which permit of their being folded one upon the other.

Sliding bolts 15 are applied at the upper edge of the plate to secure the end members thereof in their extended position and in case the attachment is designed for use on a writing machine having ribbon-spools at the top of its frame and forward of the carriage as shown at 7ª in the drawings, the plate 5 is provided with slots 5ᵉ for the passage of the ribbon to the guides in front of the platen of the carriage, as best shown in Figure 10.

The cover 10 is bound at its edges with a strip 10ª of felt or other soft material to effect a sound-proof contact with the surface of the frame, and a catch 10ᶜ is provided immediately beneath the opening at the front of the frame to lock the cover in place.

The element B of the invention comprises a casing which encloses the platen of the carriage, and the element C consists of an appliance which is fastened on the frame of the machine rearward of the carriage and which provides a slide surface for the casing and co-operates therewith to continually close the opening in the top of the frame through which the carriage slides in the operation of the machine. The casing is composed of side plates 16, a back plate 17 and a cover plate 18 which is supported upon the side plates and hinged to the back plate as at 19.

The cover and the side plates of the casing are at their forward edges, in sliding contact with the upright plate 5 and in order to render said contact sound-tight, the parts 16 and 18 are provided with edge strips of felt or other suitable material as shown at 20 in the drawings. A pair of soft-rubber stops 21 at the back of the casing provide a rest for the cover in the open position and it will be understood without further illustration that spring means may be used to facilitate the opening movement of the cover if so desired.

The cover has in its slanting front a window 22 through which the operator observes the action of the type keys and the typed portion of the work sheet upon the platen and it will be apparent without further illustration that this window may be of any desired size and be extended if necessary to include the top portion of the cover for the better admission of light to the work.

The casing is provided with slots 23 through which may protrude the feed-roll release lever and the various levers which control the movements of the carriage and the platen, or extensions of said levers as shown at 24 and 25 in Figure 5, so that they can be manipulated by the operator at the outside of the casing.

The slots which in shape and position, must necessarily be varied to correspond with the location of the levers on different makes of typewriting machines, may be closed by resilient strips of felt, rubber or other soft material as shown at 26 in Figure 11, to prevent of the escape of the noise of the keys striking the platen, through the openings, in the operation of the machine.

The cover of the casing has a longitudinal slot 27 slightly forward of the guide 28 which in most typewriting machines provides a support for the work sheet above the platen. Through this slot the paper may be fed to the platen without opening the cover, and the typed end portion of the paper moving upwardly between the platen and the guide roller 29 will find its way to and through the slot for its removal by the operator after the work is finished.

A yielding lid 30 hinged or otherwise supported on the casing, closes the slot against the escape of noise by engagement with the paper extending through the slot in the operation of the machine. The casing is mounted on the carriage by the support of its side-walls upon the trunnions 31 of the platen at opposite ends thereof. The side plates are to this end provided with vertical slots 32 which are open at their lower edges to straddle the trunnions and when the casing is in place, these slots are partially covered by parts of the element C of the attachment, hereinafter to be described.

The third element C of the invention comprises a plate 33 which is supported on the frame of the writing machine rearward of the platen and which is rigidly fastened to the same by means of clamps 34.

The plate shown in detail in Figure 12, has two forwardly projecting members 35 extending at opposite sides of the carriage. Extension plates 36 are hinged at the edges of the plate members 35 to close the casing at its underside during movement of the carriage in the operation of the machine, and said extension plates are held normally in a horizontal position by means of lever mechanism adapted to move the plates about their hinges to a substantially vertical position for the purpose of storing the machine to which the silencer is applied, in a desk-well or beneath a cover, when not in use.

The lever mechanisms hereinabove referred to are applied at opposite sides of the frame of the machine and as best shown in Figures 7, 8 and 9, each consist of a hand-lever 37 pivoted as at 38 upon a flanged bearing 39 which is fastened to the frame of the machine.

A rod 40 fulcrumed at one end upon a stud 41 on the bearing is pivotally connected with the lever as at 42 for the operation of the member which controls the position of the extension plates of the element B.

The member consists of a crank arm 43 fastened at an end of the pintle 44 of the hinge by which the respective extension plate 36 is connected at the edge of the respective member 35 of the element B, the knuckle being fixed on the extension plate by means of a knuckle plate 45.

A link 46 connects the crank arm with the end of the rod 40 and when said rod is moved to the position shown in broken lines in Figure 7, the crank arm is adjusted to the broken line position of Figure 5 and causes the extension plate to move about its pivotal axis to a substantially vertical position as indicated in the same view.

A spring 47 holds the lever in its normal position and a spring-catch 48 pivoted on the bearing 39 automatically locks the lever in its adjusted position.

The construction of the typewriting machine illustrated in the drawings requires the provision of auxiliary extension plates 49 to accommodate certain parts of the mechanism of the machine which project above the top of the frame.

The plates 49 are likewise hinged to the side members 35 of the element C, in alinement with the primary extension plates 36. The plates 49 are angular in section and they are supported upon friction rollers 50 at the ends of short levers 51 which are fulcrumed to the members 35 and which are connected with the rods 40 of the respective adjusting mechanisms by links 52.

It will be apparent that when the rods are moved to the broken line position in Figure 7 by adjustment of the hand levers 37 the consequent pivotal movement of the levers 51 to the position shown in broken lines in Figure 8, will cause the plates to move to the upright position simultaneously with the plates 36.

In order to close the opening of the frame of the writing machine beneath the carriage, I have provided plates 53 which are slidably supported in grooves of the bottom plates 36 and are fastened at the ends of the casing B.

The plates 53 are hinged in end-to-end connection with heads 54 of angular form which are fastened to the respective side plates 16 of the casing by dove-tailed tenons 55 best shown in Figure 6.

In the operation of my invention, the casing B is placed over the carriage of the writing machine with its side plates straddling the trunnions of the platen, the elements A and C are fixed to the frame of the machine by the clamps 6 and 34, the cover member 10 of the element A is fastened to the plate 5 by inserting the dowel pins 11 in the sockets 12, and the slide plates 53 of the casing are fastened at the sides thereof by inserting the dove-tailed tenons of the heads 54 of the plates into correspondingly formed grooves of the side plates of the casing.

The noise producing parts of the writing machine are now completely enclosed and owing to the sound-proof contact of the element A with the relatively fixed elements B and C, and the presence of the several plates 36, 49 and 53 which co-operatively close the underside of the casing and the opening of the frame of the machine below the carriage, the sounds produced in the operation of the machine are deadened so as to be barely perceptible to persons in the vicinity of the machine.

When the machine is not in use, it may be stored in the well of a typewriter desk, under a cover, or in other spaces of limited proportions by folding the extensions 13 of the plate 5 upon the relatively fixed body portion of the same after the bolts 15 have been withdrawn from their sockets, and by adjusting the plates which close the underside of the casing and the top of the frame underneath the carriage, to an upright position, by manipulation of the hand levers 37.

It is a distinctive feature of the invention that it is applicable to different types of writing machines without material changes in the construction thereof and without any detrimental effect upon the operation or upon the efficiency of the operator.

The levers controlling the movements of the carriage and the platen are as accessible to the operator as before the attachment was applied, the work-sheets are inserted and removed through the lid covered slot in the top of the casing, the writing on the work sheet is constantly visible to the operator through the window in the casing, and it is readily reached for erasure or correction by lifting the cover of the same.

My invention thus provides a simple and inexpensive means for converting a standard writing machine of ordinary construction to one having all the advantages and none of the disadvantages of other machines specially designed to deaden or reduce the sounds of operation.

When the attachment is applied to a writing machine of the kind in which the carriage or the platen is shifted upwardly for typing upper case characters, the movement of the casing with the carriage will cause it to separate from the parts which normally close its underside at opposite sides of the machine and thereby produce spaces through which the sound of the keys striking the platen may escape. In order to permanently maintain a sound-proof contact between the casing and the parts above referred to, I have provided strips 60 at the lower edges of the side plates 16 and the back plate 17 of the casing, which by sliding connection with the casing through the medium of screws or pins 61, remain in place upon the bottom closures of the casing when the latter moves upwardly with the carriage.

A similar result may be attained by lengthening the slots 32 in the side plates of the casing as shown in Figure 14 of the drawings, in which case, the carriage moves upwardly separate from the casing which remains in contact with the parts by which its underside is closed.

Having thus described my improved silencer in the most simple and practical form at present known to me, I desire it understood that variations in the construction and arrangement of the parts thereof may be resorted to without departing from the spirit of my invention.

What I claim and desire to secure by Letters Patent is:

1. A silencing attachment for typewriters comprising in combination with the frame and the carriage of a writing machine, an element fixed on the frame, and an enclosing element on the carriage, in sound-proof engagement with the first mentioned element.

2. A silencing attachment for typewriters comprising in combination with the frame and the carriage of a writing machine, an element removably fastened on the frame forward of the carriage, and an enclosing element removably supported on the carriage, in sound-proof engagement with the first mentioned element.

3. A silencing attachment for typewriters comprising in combination with the frame and the carriage of a writing machine, an element fixed on the frame, and a partially transparent enclosing element on the carriage, in sound-proof engagement with the first mentioned element.

4. A silencing attachment for typewriters comprising in combination with the frame and the carriage of a writing machine, an upright plate fixed on the frame forward of the carriage, and an enclosing element on the carriage, in sliding contact with the plate.

5. A silencing attachment for typewriters comprising in combination with the frame and the carriage of a writing machine, an upright, partially transparent plate fixed on the frame forward of the carriage, and an enclosing element on the carriage, in sliding contact with the plate.

6. A silencing attachment for typewriters comprising in combination with the frame and the carriage of a writing machine, an element having a slide-face and including a body portion fixed on the frame and folding extensions at opposite ends of the body portion, and an enclosing element on the carriage, in sliding contact with said slide-face.

7. A silencing attachment for typewriters comprising in combination with the frame and the carriage of a writing machine, an element having a slide-face and including a body portion fixed on the frame, movable extensions at opposite ends of the body portion, and adjustable means to secure the end portions in their extended position, and an enclosing element on the carriage in sliding contact with said slide-face.

8. A silencing attachment for typewriters comprising in combination with the partially open frame and the carriage of a writing machine, an element fixed on the frame forward of the carriage and including a member having a slide-face, and a forwardly projecting cover member which closes the opening of the frame, and an enclosing element on the carriage, in sliding contact with said slide-face.

9. A silencing attachment for typewriters comprising in combination with the partially open frame and the carriage of a writing machine, an element fixed on the frame forward of the carriage and including a member having a slide-face and a forwardly projecting cover member which closes openings at the top and front of the frame, and an enclosing element on the carriage in sliding contact with the plate-member.

10. A silencing attachment for typewriters comprising in combination with the partially open frame and the carriage of a writing machine, an element detachably fastened on the frame forward of the carriage and including a member having a slide-face, and a forwardly projecting cover member which is detachably fastened to the other member and which closes the opening of the frame, and an enclosing element on the carriage, in sliding contact with said slide-face.

11. A silencing attachment for typewriters comprising in combination with the frame and the carriage of a writing machine, an element fixed on the frame, and an element mounted on the carriage, the elements being co-operatively engaged to enclose the sound producing parts of the machine.

12. A silencing attachment for typewriters comprising in combination with the frame and the carriage of a writing machine, an element fixed on the frame, and a casing on the carriage in sliding engagement with said element and including a hinged lid affording access to the platen of the same.

13. A silencing attachment for typewriters comprising in combination with the frame and the carriage of a writing machine, an element fixed on the frame, and a casing on the carriage in sliding engagement with said element and having openings for the protrusion of levers on the carriage.

14. A silencing attachment for typewriters comprising in combination with the frame and the carriage of a writing machine, an element fixed on the frame, and a casing on the carriage in sliding engagement with said element and having openings for the protrusion of levers on the carriage and yieldable closures for the openings.

15. A silencing attachment for typewriters comprising in combination with the frame and the carriage of a writing machine, an element fixed on the frame, and a casing on the carriage in sliding engagement with said element and having a slot to admit a work sheet to the platen of the carriage.

16. A silencing attachment for typewriters comprising in combination with the frame and the carriage of a writing machine, an element fixed on the frame, and a casing on the carriage in sliding engagement with said element and having a slot to admit a work sheet to the platen of the carriage and a yieldable closure for said slot.

17. A silencing attachment for typewriters comprising in combination with the frame and the carriage of a writing machine, an element fixed on the frame, and a casing on the carriage in sliding contact with said element and including slotted side-members straddling the trunnions of a platen of the carriage.

18. A silencing attachment for typewriters comprising in combination with the frame and the carriage of a writing machine, a casing on the carriage, and means to close the underside of the casing during movement of the carriage.

19. A silencing attachment for typewriters comprising in combination with the frame and the carriage of a writing machine, a casing on the carriage and foldable lever-controlled means to close the underside of the casing during its movement with the carriage.

20. A silencing attachment for typewriters comprising in combination with the frame and the carriage of a writing machine, a casing on the carriage and foldable lever-controlled means to close the underside of the casing during its movement with the carriage.

21. A silencing attachment for typewriters comprising in combination with the frame and the carriage of a writing machine, a casing on the carriage, foldable means to close the underside of the casing during its movement with the carriage, and manual mechanism for the adjustment of said means.

22. A silencing attachment for typewriters comprising in combination with the frame and the carriage of a writing machine, a casing on the carriage, including means to close the frame beneath the carriage during its movement with the carriage.

23. A silencing attachment for typewriters comprising in combination with the frame and the carriage of a writing machine, a casing on the carriage, including foldable means to close the frame beneath the carriage during its movement with the carriage.

24. A silencing attachment for typewriters comprising in combination with the frame and the carriage of a writing machine, a casing on the carriage, and an element fixed on the frame and including means to close the underside of the casing during its movement with the carriage.

25. A silencing attachment for typewriters comprising in combination with the frame and the carriage of a writing machine, a casing on the carriage and members extending outwardly at the ends of the casing for closing the frame beneath the carriage during movement of the casing with the carriage.

26. A silencing attachment for typewriters comprising in combination with the frame and the carriage of a writing machine, a casing on the carriage, and members detachably connected at the ends of the casing, to close the frame beneath the carriage during movement of the casing with the carriage.

27. A silencing attachment for typewriters comprising in combination with the frame and the carriage of a writing machine, a casing on the carriage, and outwardly projecting, folding members at the ends of the casing, to close the frame beneath the carriage during movement of the casing with the carriage.

28. A silencing attachment for typewriters comprising in combination with the frame and the carriage of a writing machine, a casing on the carriage, means to close the underside of the casing during its movement with the carriage, and members on the casing associated with said means, to close the frame beneath the carriage.

29. A silencing attachment for typewriters comprising in combination with the frame and the carriage of a writing machine, a casing on the carriage, means to close the underside of the casing during its movement with the carriage, and members on the casing to close the frame beneath the carriage, movably supported on said closing means.

30. A silencing attachment for typewriters comprising in combination with the frame and the carriage of a writing machine, a casing on the carriage, and an element fixed on the frame and including members at opposite ends of the same, to close the underside of the casing during its movement with the carriage.

31. A silencing attachment for typewriters comprising in combination with the frame and the carriage of a writing machine, a casing on the carriage, an element fixed on the frame and including members at opposite ends of the same, to close the underside of the casing during its movement with the carriage, and members at opposite ends of the casing, to close the frame underneath the carriage, movably supported by said element.

32. A silencing attachment for typewriters comprising in combination with the frame and the carriage of a writing machine, a casing on the carriage, and an element detachably fixed on the frame and including members at opposite ends of the same, to close the underside of the casing during its movement with the carriage.

33. A silencing device for typewriters comprising in combination with the frame and the carriage of a writing machine, a casing on the carriage, an element fixed on the frame and extending at opposite ends thereof, and closing means for the underside of the casing during movement of the carriage, foldably connected with said element.

34. A silencing device for typewriters comprising in combination with the frame and the carriage of a writing machine, a casing on the carriage, an element fixed on the frame and extending at opposite ends thereof, closing means for the underside of the casing during movement of the carriage, foldably connected with said element, and members for closing the frame beneath the carriage, foldably connected at opposite ends of the casing and movably supported by said closing means.

35. A silencing attachment for typewriters comprising in combination with the frame and the upwardly shiftable carriage of a writing machine, of a casing on the carriage, a closure for the underside of the casing, mounted on the frame, and means for closing spaces between the casing and the closure during upward movement of the carriage.

36. A silencing attachment for typewriters comprising in combination with the frame and the upwardly shiftable carriage of a writing machine, of a casing on the carriage, a closure for the underside of the casing, mounted on the frame, and sliding strips on the casing, to close spaces between the casing and the closure during upward movement of the carriage.

37. In a silencing device for writing machines, a revoluble platen, a platen carriage enclosing cover having a slot positioned relative to the platen to admit of the insertion of a work sheet to the platen of the carriage, said slot substantially coterminous with the platen, and said cover mounted on said carriage to travel therewith, to keep the slot always in register with the platen.

In testimony whereof I have affixed my signature.

ROYAL G. DANIEL.